(12) United States Patent
Borgsmüller et al.

(10) Patent No.: US 8,248,908 B2
(45) Date of Patent: Aug. 21, 2012

(54) STORAGE MEDIUM COMPRISING A SECURITY FEATURE AND METHOD FOR PRODUCING A STORAGE MEDIUM COMPRISING A SECURITY FEATURE

(75) Inventors: Stefan Borgsmüller, Heidelberg (DE); Steffen Noehte, Weinheim (DE); Kay Schulte-Wieking, Heidelberg (DE)

(73) Assignee: tesa Scribos GmbH, Heidelberg (DE)

( * ) Notice: Subject to any disclaimer, the term of this patent is extended or adjusted under 35 U.S.C. 154(b) by 990 days.

(21) Appl. No.: 12/279,791

(22) PCT Filed: Apr. 2, 2007

(86) PCT No.: PCT/EP2007/002938
§ 371 (c)(1),
(2), (4) Date: Sep. 19, 2008

(87) PCT Pub. No.: WO2007/115720
PCT Pub. Date: Oct. 18, 2007

(65) Prior Publication Data
US 2009/0016208 A1  Jan. 15, 2009

(30) Foreign Application Priority Data

Apr. 4, 2006 (DE) .......................... 10 2006 015 610
Jul. 13, 2006 (DE) .......................... 10 2006 032 538

(51) Int. Cl.
*G11B 7/24* (2006.01)
(52) U.S. Cl. ....................................................... 369/283
(58) Field of Classification Search .................... 369/283
See application file for complete search history.

(56) References Cited

U.S. PATENT DOCUMENTS

| 7,269,123 | B2* | 9/2007 | Abraham et al. | 369/283 |
| 7,813,258 | B2* | 10/2010 | Shintani et al. | 369/284 |
| 7,936,660 | B2* | 5/2011 | Vast et al. | 369/275.3 |

FOREIGN PATENT DOCUMENTS

| DE | 101 37 832 | 12/2002 |
| WO | 02/03104 A | 1/2002 |
| WO | 02/079881 | 10/2002 |
| WO | 02/079883 | 10/2002 |
| WO | 02/084405 | 10/2002 |
| WO | 02/084588 | 10/2002 |
| WO | 03/012549 | 2/2003 |

(Continued)

OTHER PUBLICATIONS

English Language Abstract for DE 10137832.

(Continued)

*Primary Examiner* — Mark Blouin
(74) *Attorney, Agent, or Firm* — Norris, McLaughlin & Marcus, P.A.

(57) ABSTRACT

The invention relates to a storage medium comprising a security feature, having a substrate (1, 4, 10), at least one functional layer (2, 5, 11), at least one feature which is written into the functional layer (2, 5, 11) and is visible when reflected and at least one feature which is written into the functional layer (2, 5, 11) and is visible when transmitted, at least one feature being individualized and at least one feature having a diffractive structure. The invention solves the technical problem of providing a larger variety of combinations of different security features. The invention also relates to a method for producing a storage medium comprising a security feature.

30 Claims, 4 Drawing Sheets

FOREIGN PATENT DOCUMENTS

| | | |
|---|---|---|
| WO | 02/084404 | 10/2004 |
| WO | 2005/111913 | 11/2005 |
| WO | 2005105472 A2 | 11/2005 |

OTHER PUBLICATIONS

English Language Abstract for WO 02079881.
English Language Abstract for WO 02079883.
English Language Abstract for WO 02084404.
English Language Abstract for WO 02084588.
English Language Abstract for WO 03012549.
English Language Abstract for WO 2005111913.
English Language Abstract for WO 02084405.

* cited by examiner

STORAGE MEDIUM COMPRISING A SECURITY FEATURE AND METHOD FOR PRODUCING A STORAGE MEDIUM COMPRISING A SECURITY FEATURE

This is an application filed under 35 USC §371 of PCT/EP2007/002938, claiming priority under DE 10 2006 015 610.2 filed on Apr. 4, 2006 and DE 10 2006 032 538.9 filed on Jul. 13, 2006.

BACKGROUND OF THE INVENTION (a) Title of the Invention
(b) Cross-Reference To Related Applications
(c) Statement Regarding Federally Sponsored Research or Development
(d) The Names of the Parties to a Joint Research Agreement
(e) Incorporation-By-Reference of Material Submitted on a Compact Disc
(f) Background Of The Invention
   (1) Field of the Invention
   (2) Description of Related Art Including Information Disclosed Under 37 CFR 1.97 and 1.98
(g) Brief Summary of the Invention
(h) Brief Description of the Several Views of the Drawing(s)
(i) Detailed Description of the Invention
(j) Claim or Claims
   Commencing on a Separate Sheet
(k) Abstract of the Disclosure
   Commending on a Separate Sheet
(l) Sequence Listing The invention relates to a storage medium comprising a security feature and a method for producing a storage medium comprising a security feature.

The security features known from the prior art can be formed for example from computer-generated holograms comprising one or more layers of dot matrices or dot distributions which, upon illumination with a preferably coherent light beam, lead to a reconstruction of the information coded in the hologram. In this case, the dot distribution can be calculated as an amplitude hologram, phase hologram or as a kinoform, Fourier or Fresnell hologram. In order to produce computer-generated holograms, the latter are first calculated and then written to a storage medium by means of a suitable writing device by dotwise introduction of energy. The resolution of the resultant dot-matrix can be in the range of down to less than 1 µm. consequently, holograms having a high resolution can be written in a confined space, the information of which holograms can only be read out by illumination with a light beam and reconstruction of the diffraction pattern. In this case, the size of the holograms can be between less than 1 mm$^2$ and plural 1 cm$^2$. A structuring of the type described above can also be referred to as microstructuring.

The computer-generated holograms described above can be combined with directly visible information (microscript, microimages, coded information).

The prior art furthermore discloses a plurality of writing devices for writing computer-generated holograms which write the optical structures of the holograms in planar storage media. By way of example, in this respect reference is made to the documents WO 02/079881, WO 02/079883, WO 02/084404, WO 02/084405 and WO 03/012549. Writing devices of this type are also referred to as laser lithography units whereas lithographic systems.

BRIEF SUMMARY OF THE INVENTION

A plurality of reading devices are likewise known which are suitable for making the reconstruction visible by illumination of the hologram area by means of a light beam and a suitable optical unit or for making it electronically representable and evaluatable by means of pick-up means. By way of example, in this case reference is made to the documents DE 101 37 832, WO 02/084588 and WO 2005/111913.

Structures which diffract visible light are therefore largely known and—as already explained—are used as security features since counterfeiting them constitutes a considerable technical outlay since they are constructed from structures having structure sizes in the range of the optical wavelengths. Structures of this type are usually realized as reflective structures. However, they can also be realized as a transmissively observable/readable structure.

The invention is based on the technical problem of specifying a method for producing a storage medium comprising a security feature and a storage medium comprising a security feature having a larger variety of combinations of different security features is made possible.

The technical problem is solved by means of a storage medium comprising a security feature, comprising a substrate, comprising at least one functional layer, comprising at least one feature which is written in the functional layer and can be observed in reflection, and comprising at least one feature which is written in the functional layer and can be observed in transmission, wherein at least one feature is individualized and wherein at least one feature has a diffractive structure.

The technical problem presented above is also solved by means of a method for producing a storage medium comprising a security feature,
in which, in at least one functional layer of the storage medium, at least one feature which can be observed in reflection, that is to say a reflectively diffractive structure and/or information content or structure and/or information content that can be observed reflectively by means of brightness modulations, is written in the storage medium,
in which at least one feature which can be observed in transmission, that is to say a transmissively diffractive structure and/or information content or structure and/or information content that can be observed transmissively by means of brightness modulations, is written in the at least one functional layer of the storage medium,
wherein at least one feature is individualized, and wherein at least one feature is written as a diffractive structure.

In this case, it is preferred for the features to be written as microstructurings into the storage medium. Consequently, it is specified for the first time that different microstructurings which can be observed in reflection and transmission are contained in a functional layer of a storage medium or can be written by the same production method.

Diffractive structures may in this case be simple grating arrangements, complex grating arrangements or holograms. The method according to the invention thus enables a plurality of different ways of storing and reading items of information in one and the same material. In this case, a separate individual information item can be stored by each individual way of storage. In this case, individual information is understood to mean for example any information which relates to one or more properties of the object on which the storage medium is to be applied as a security feature. Examples of such properties are serial numbers or production data.

In this case, the configuration of the stored information items of the different ways of storage can comprise e.g. one or more types, and can comprise e.g. digital data, text, numerals, serial numbers, images, faces, logos or patterns.

In a storage medium produced according to the invention, the regions which differ in terms of their way of storing information can be situated at different locations, but said regions can also partly or completely overlap, such that in the latter case different information items are stored at one and the same location and can be read therefrom by different ways of reading.

Typical ways of reading the information items stored in different ways may be, for example:
- observing metallically lustrous structures in reflection by the naked eye, wherein brightnesses of different magnitudes can be observed
- observing diffractive structures in reflection by the naked eye, wherein different brightnesses and/or colors can be identified
- reading out holographic structures in reflection by means of a suitable device
- reading out diffractive or holographic structures in transmission by means of a suitable device or by the naked eye by means of a suitable light source
- reading out structures in transmission which are produced by means of brightness modulations (gray-scale images), by means of coherent, and especially also by means of non-coherent light, for example by means of normal daylight, by means of a lamp, by means of an incandescent bulb, etc.

The method according to the invention makes it possible to produce objects which can serve as a security feature and afford increased security against counterfeiting relative to known diffractive security features since different ways of storage are realized in one and the same storage medium and can even be situated at one and the same location, which represents a major technical hurdle for counterfeiting attempts owing to the increased complexity of the production of such objects.

The uniting of ways of storage that require a specific device for read-out in combination with information contents that are to be simply checked in this case constitutes a combination of the ways of storage which realizes a plurality of security levels in one and the same object and thus exhibits advantages over previously known security features since the latter often only offer items of information at one security level. Such a combination of security levels preferably consists in the fact that at least one feature is a level-one security feature and at least one feature is a level-two or level-three security feature. Level-one security feature denotes a feature which is visible by the naked eye and can be verified without further aids, for example gray-scale images which can be read out in transmission by means of daylight. Level-two security feature denotes a feature which can be verified using simple or standard aids (e.g. a magnifying glass, a UV lamp, a barcode reader). Level-three security feature denotes a feature which can be verified only by means of special equipment. The storage of holographic digital data, in particular, can be effected as a level-two security feature or as a level-three security feature.

The invention furthermore describes a storage medium which is suitable for producing such structures in a lithographic process that uses laser radiation.

BRIEF DESCRIPTION OF THE DRAWINGS

The invention is explained in more detail on the basis of various exemplary embodiments, for which purpose reference is made to the accompanying drawing. The various examples are used to describe different types of structures which can be produced by means of a lithographic process. In the drawing:

FIG. 2 shows the storage medium illustrated in FIG. 1 with various structures written in, FIG. 3 shows the storage medium illustrated in FIG. 1 with various structures written in.

DETAILED DESCRIPTION OF THE INVENTION

The basic construction of the storage medium is described as follows.

Figure 1:
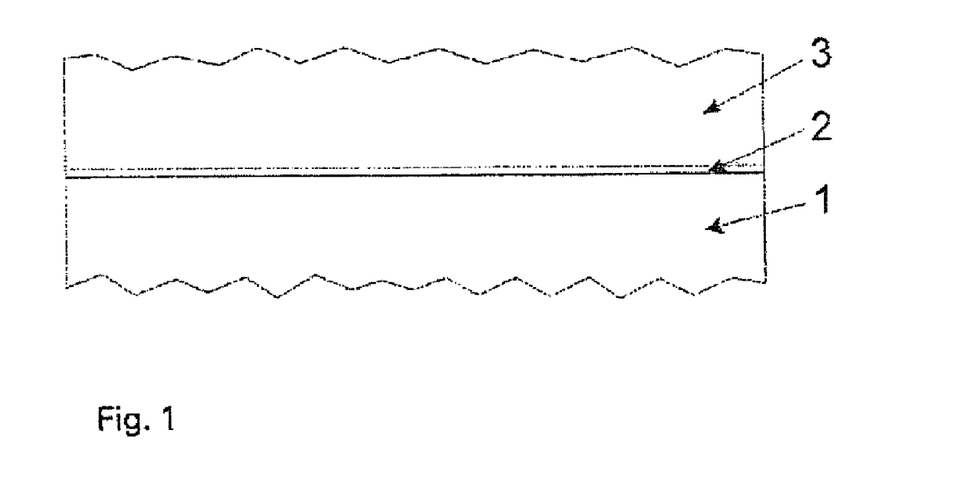
FIG. 1 shows a schematic construction of a storage medium.

A storage medium illustrated in FIG. 1 comprises, in its simplest form, a polymer film 1, preferably an oriented polymer film, which is at least partly transparent to visible light, and at least one functional layer 2 which absorbs the laser radiation during the lithographic writing process and is at least partly transparent. Preferably no further layers are arranged between the film 1 and the functional layer 2. A further additional layer 3 can furthermore be present on the functional layer 2.

In FIG. 1, the lithographic writing is effected from below through the film 1 onto the functional layer 2 or else from above onto the functional layer 2 through the additional layer 3 possibly present.

The additional layers 3 can be lacquers, protective layers, polymer layers, transparent glasses, crystalline layers, semiconductors, antireflection layers or further functional layers.

A lithographic process or writing process can be carried out through the film 1 onto the functional layer 2 or else alternatively through additional layers 3 directly onto the functional layer 2. During the lithographic writing process, the functional layer 2 has the task, inter alia, of at least partly absorbing the laser radiation and converting it into heat and emitting the latter at least partly to the film 1.

Instead of one functional layer 2, it is also possible to provide two or more functional layers 2 which are arranged one above another and which supplement or reinforce one another in terms of their function.

Figure 2:
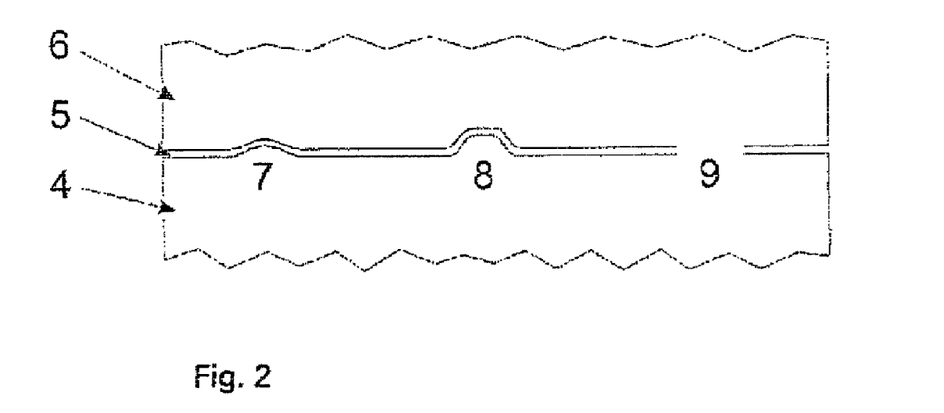
Figure 3:
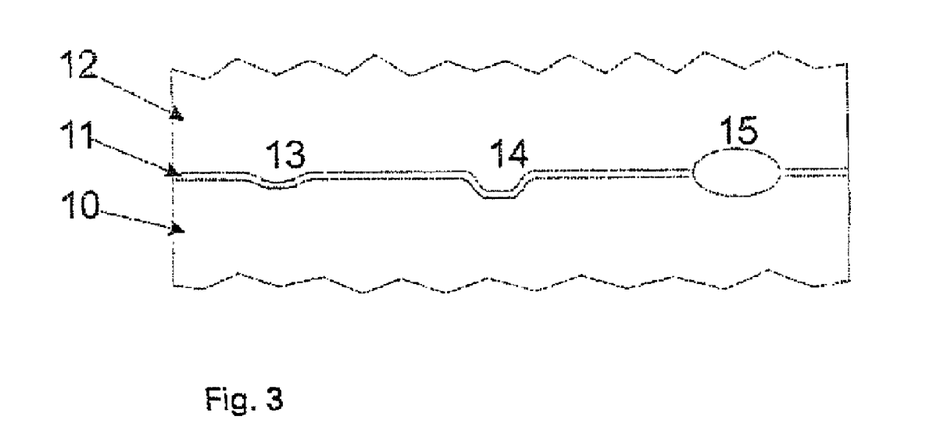

FIGS. 2 and 3 illustrate various types of structures which can be produced in a lithographic process or writing process that uses laser radiation, for example. In this case, the construction of the storage medium essentially corresponds to that of the storage medium illustrated in FIG. 1, comprising the film 4 and 10, respectively, the at least one functional layer 5 and 11, respectively, and the additional layer 6 and 12, respectively, possibly present.

If the information to be written is introduced into the storage medium with the aid of a lithographic system that uses focused laser radiation, then a focused laser beam produces a small structure in the storage medium by means of a short laser pulse (or a plurality of successive pulses), which structure, together with many structures written in this way, produces the desired diffractive or holographic or directly visible overall structure.

The following structures which are produced differently and act differently can be realized in this case.

In FIG. 2, the structure 7 represents a structure with Type 1a+, the structure 8 represents a structure with Type 1b+ and the structure 9 represents a structure with Type 2.

In FIG. 3, the structure 13 represents a structure with Type 1a−, the structure 8 represents a structure with Type 1b− and the structure 9 represents a structure with Type 3.

The structures shown in FIGS. 2 and 3 can be produced depending on the temperature present during the lithographic writing process in the functional layers or the film.

FIG. 2 shows firstly relief formations of a certain height on the basis of the structure 7 as elevation of the film surface according to Type 1a+ and on the basis of the structure 8 an elevation of the film surface according to Type 1b+ with a larger height than in the case of the structure 7 with Type 1a+. Secondly, a removal of the at least one functional layer 5 corresponds to a demetalization on the basis of the example of the structure 9 according to Type 2, in the case that one of the functional layers 5 is a metal layer.

FIG. 3 shows relief formations on the basis of the structure 13 with Type 1a− and on the basis of the structure 14 with Type 1b−, similar to the Types 1a+ and 1b+, respectively, but in the form of a depression in the film surface. FIG. 3 furthermore shows a structure formation in the form of the structure 15 with Type 3, which changes the phase of the light upon illumination with a reading beam. The structure 15 can be embodied for example in the form of a refractive index change of the film 10. A Type 3 structure can also be a gas bubble formed by the exposure process.

Depending on the quantity of the energy which is absorbed during the writing process and which is converted into heat, and on the quantity of the heat which is transmitted to the film, and the thermodynamic behavior of the film and the functional layer(s) it is possible to obtain relief formations in the film or else demetalizations or structure changes of Type 3.

For this purpose, in a lithographic process, the total energy of an individual laser writing pulse can serve as a suitable process parameter. Given the same laser power, different energies can be introduced into the storage medium by means of laser pulses of different lengths. Short pulses generate low energies, medium pulses generate medium energies and long pulses generate high energies. Both the type of exposure and the fashioning, i.e. within certain limits the size of the exposed point can thereby be influenced.

Structures of Type 1a, that is to say small relief formations, can be produced by means of low energies.

Structures of Type 1b, that is to say large relief formations, can be produced by means of medium energies.

Structures of Type 2, that is to say demetalizations, and structures of Type 3 can be produced by means of high energies.

By way of example, using suitable laser lithography units (diffraction-limited, 100-1000 mW laser power in the visible or IR, UV range), for one and the same material and one and the same laser power, Types 1a, 1b and 2 can be produced by means of laser pulse lengths of 150 ns, 300 ns and 600 ns.

In a lithographic process, the laser power can serve as a further process parameter. Structures of Type 1a, Type 1b and, respectively, Type 2 and Type 3 can be produced with pulses of equal length with weak, medium and high laser power, respectively.

In a lithographic process, the number of individual pulses can serve as a further process parameter. Given pulses of identical energy, e.g. a structure of Type 1a can be produced by means of one pulse, a structure of Type 1b can be produced by means of a double pulse (two pulses with a short intermission, and a structure of Type 2 or Type 3 can be produced by means of a triple pulse.

Further combinations of number of pulses, laser power, pulse duration, temporal laser pulse separation are possible.

The properties of structures of Types 1a, 1b, 2, 3 produced are described in detail below; it lies within the scope of the invention to combine the properties of differently configured layers with one another.

Relief formations (structures of Types 1a, 1b), influence the phase of the light during read-out in reflection and are therefore diffractive phase patterns. In transmission, they have no or hardly any effect.

Phase changes in the film or bubble formations (structures of Type 3) lead to phase influencing in reflection and transmission.

Demetalizations (structures of Type 2) influence the amplitude of the light both during read-out in reflection and during read-out in transmission and are therefore diffractive amplitude patterns.

A storage material can be written to lithographically with a structure according to Type 1a having the following properties:
  Functional layers are maintained, such that no change in the optical density (OD) occurs upon viewing in transmission with e.g. white light.
  Grating structures formed from relief formations lead to diffraction phenomena upon viewing in reflection. Grating or complex gratings can appear in different colors in this case.
  Holographic structures can be read in reflection by means of a suitable device.
  Relief formations, in transmissive illumination, lead to virtually no diffraction or to diffraction effects having negligibly small diffraction efficiencies.

A storage material can be written to lithographically with a structure according to Type 1b having the following properties:
  Functional layers are maintained, such that no change in the optical density (OD) occurs upon viewing in transmission with e.g. white light.
  Grating structures formed from relief formations lead to diffraction phenomena upon viewing in reflection. Gratings or complex gratings can appear in different colors in this case and are brighter than identical structures of Type 1a.
  Holographic structures can be read in reflection by means of a suitable device and diffract to a greater extent than structures of Type 1a.
  Relief formations, in transmissive illumination, lead to virtually no diffraction or to diffraction effects having negligibly small diffraction efficiencies.

A storage material can be written to lithographically with a structure according to Type 2 having the following properties:

Functional layers are not maintained, such that a change in the optical density (OD) is produced upon viewing in transmission with e.g. white light. This effect can take place a really, such that a maximum transmission results in the case of an areal demetalization, or else lead to a desired gray-scale value by means of a corresponding scaling of metalized and demetalized areas.

Grating structures formed from amplitude patterns lead to diffraction phenomena upon viewing in reflection. Gratings or complex gratings can appear in different colors in this case.

Grating structures formed from amplitude patterns lead to diffraction phenomena upon viewing in transmission.

Holographic structures can be read in reflection by means of a suitable device.

Holographic structures can be read in transmission by means of a suitable device or by the naked eye by means of a suitable light source.

A storage material can be written to lithographically with a structure according to Type 3 having the following properties:

Functional layers are not maintained, such that a change in the optical density (OD) is produced upon viewing in transmission with e.g. white light. This effect can take place a really, such that a maximum transmission results in the case of an areal demetalization, or else lead to a desired gray-scale value by means of a corresponding scaling of metalized and demetalized areas.

Grating structures lead to diffraction phenomena upon viewing in reflection. Gratings or complex gratings can appear in different colors in this case.

Grating structures lead to diffraction phenomena upon viewing in transmission.

Holographic structures can be read in reflection by means of a suitable device.

Holographic structures can be read in transmission by means of a suitable device or by the naked eye by means of a suitable light source.

The preferred combinations of different structures are described below.

As has already been described above, the different ways of storage, i.e. areas that have been written to according to Types 1a, 1b and 2 or 3, can contain different information items.

Thus, holographic structures can contain in their reconstruction digital data, texts, numerals, serial numbers, images, faces, logos, patterns, coded data contents, etc.

Identical data contents can be produced by reflective structures as diffraction patterns. Such information contents can likewise be produced by demetalization as gray-scale images which are viewed in transmissive arrangement.

Different information contents can be combined with one another. It is thus known, for example, that a pictorial information item, e.g. a face, is combined with a hologram in such a way that the face can be discerned by the naked eye upon viewing in reflection, but the same structure also contains a holographic information item upon read-out in reflection with the aid of a corresponding reading device.

Combinations of this type can now be extended by the aspect of transmissive read-out.

Figure 4:
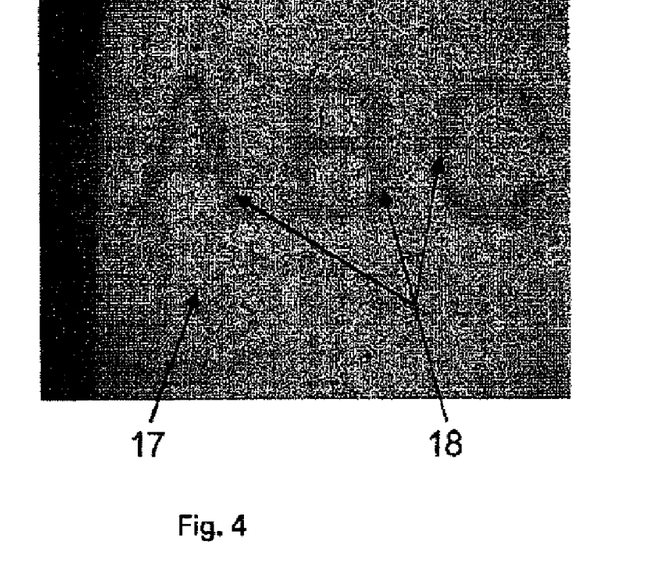
FIG. 4 shows an exemplary embodiment of a combination of a hologram structure written according to Type 2 with a grating structure in the form of a lettering according to Type 1b recorded using transmitted light against a bright background.

The illustration in FIG. 4 was recorded using transmitted light against a bright background. The non-demetalized regions appear dark. FIG. 4 shows by way of example that a hologram structure 17 written according to Type 2 can be combined with a grating structure 18 in the form of a lettering according to Type 1b. The hologram structure therefore appears bright in transmission, and the lettering appears dark in transmission.

Figure 5:
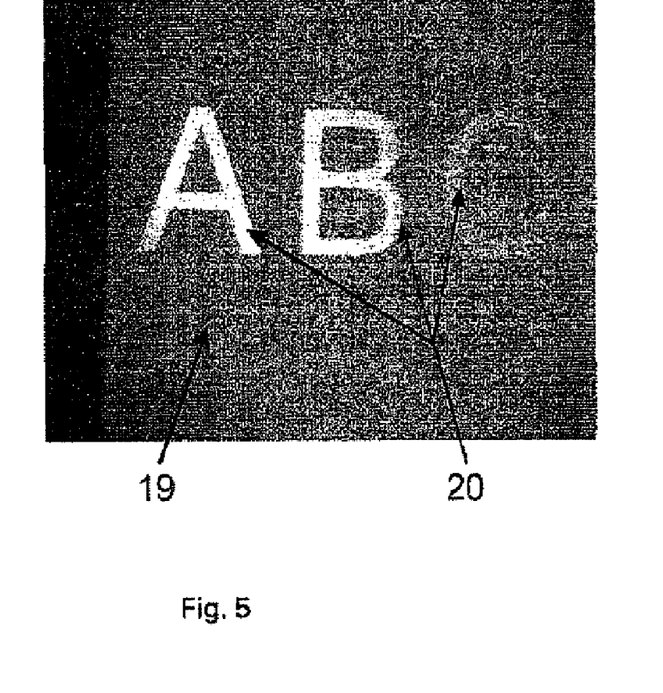
FIG. 5 shows the combination shown in FIG. 4 recorded in reflection.

FIG. 5 shows a hologram 19, which was written according to Type 2, and a text 20 as grating structure according to Type 1b. The illustration of FIG. 5 was recorded in reflection. The non-demetalized regions containing gratings appear bright. FIG. 5 shows that, when viewed in reflection, the lettering appears bright on the diffuse hologram background on account of the diffraction.

Both in transmission and in reflection, the holographic information 17 and 19, respectively, can be read out by means of a corresponding reading device.

Figure 6:
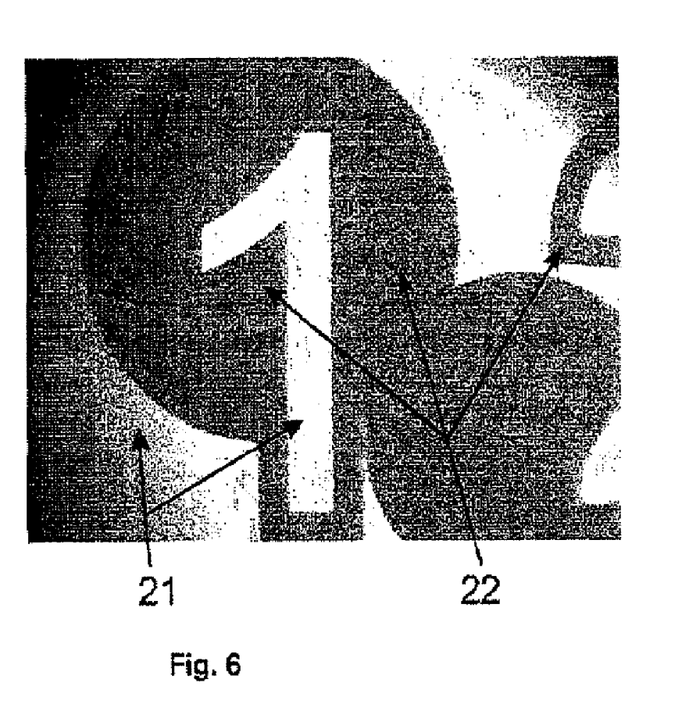
FIG. 6 shows an exemplary embodiment of a combination of a hologram structure written according to Type 2 and a numeral or graphical elements in the form of different grating structures according to Type 1b recorded using transmitted light against a bright background.

FIG. 6 shows a combination similar to that in FIG. 4. A hologram 22 has been written according to Type 2 and a numeral 22 or graphical elements 22 have been written as different grating structures according to Type 1b. FIG. 6 shows an illustration recorded in transmitted light against a bright background. The non-demetalized regions appear dark.

The regions 22 that can be discerned as dark in FIG. 6 contain different grating structures. Holographic structures written according to Type 1b could also be situated here, however. Once again the hologram structure 21 appears bright in transmission, and the graphical elements 22 appear dark in transmission.

Figure 7:
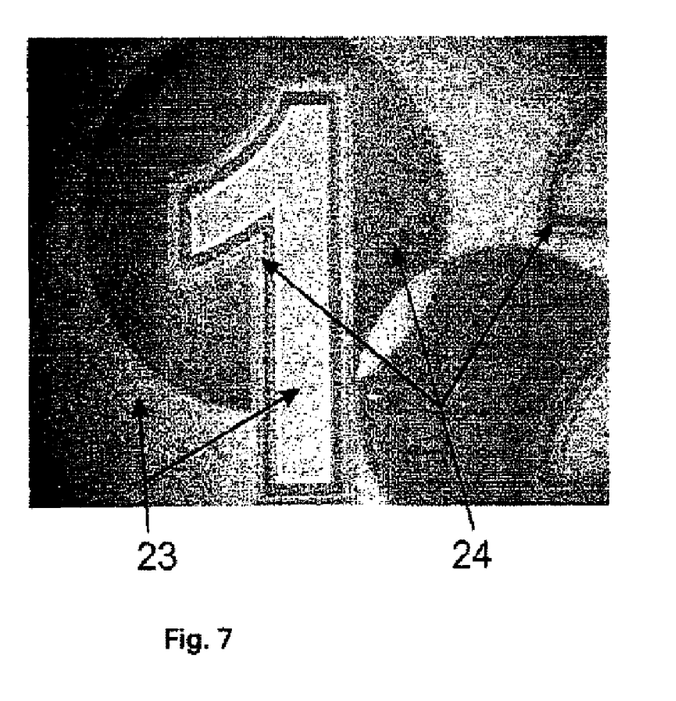
FIG. 7 shows the combination shown in FIG. 6 recorded in reflection.

FIG. 7 shows a hologram 23 according to Type 2 and a numeral or graphical elements 24 as different grating structures according to Type 1b. The illustration according to FIG. 7 was recorded in reflection. The non-demetalized regions containing gratings appear bright and in color, the different colors being represented as gray shades in the illustration. When viewed in reflection, it can be discerned that the graphical elements 24 contain different diffraction gratings.

Here as well, both in transmission and in reflection, the holographic information can be read out from 21 and 23, respectively, by means of a corresponding reading device.

Figure 8:
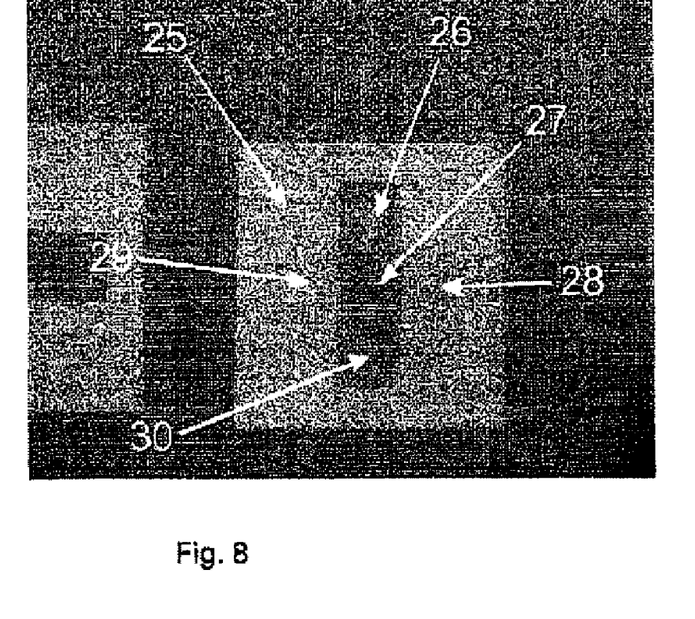
FIG. 8 shows an exemplary embodiment of a combination of overlapping areas having different information contents with transmissive observation against a bright background, wherein a vertical dark bar can be discerned on a bright background.

FIG. 8 shows a functional example which makes it clear that areas having different information contents can overlap. Thus, the example shown in FIG. 8 is constructed from six regions 25, 26, 27, 28, 29 and 30, wherein the regions 28 and 29 are produced identically, as are the regions 26 and 30.

The region 25 contains a holographic information item, written according to Type 2. The regions 28 and 29 contain a grating structure according to Type 2, that is to say that these regions appear bright in transmissive observation in FIG. 8.

The regions 26 and 30 contain the same holographic information as the region 25, although the regions 26 and 30 are produced according to Type 1b. The region 27 contains a grating structure written according to Type 1b, that is to say that these regions appear dark in transmissive observation in FIG. 8.

As a result, in transmissive observation against a bright background, a vertical dark bar can be discerned on a bright background.

Figure 9:
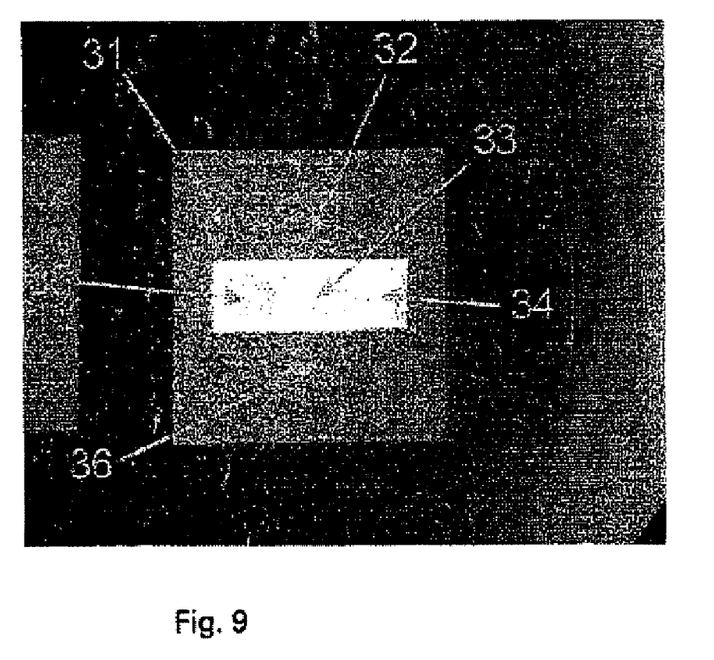
FIG. 9 shows the combination shown in FIG. 6 recorded in reflection, wherein a bright horizontal bar can be discerned on a dark background.

FIG. 9 shows in reflective observation that the bright diffractive structure of the regions 33, 34 and 35 is clearly discernable, wherein the latter were produced according to two different types. By contrast, the hologram region 31, 32 and 36 can be discerned as a gray background. As a result, a bright horizontal bar can be discerned in reflection.

By comparison with the examples from FIGS. 4 to 7, the examples from FIGS. 8 and 9, in particular, show that metalized and non-metalized, and diffractive and non-diffractive regions can overlap. An item of information visible in reflection can comprise a grating orientation which, however, was produced according to different types and, consequently, does not have to show the same visible information in transmissive viewing.

The invention claimed is:

1. A storage medium comprising a security feature, comprising
   a substrate (1,4,10),
   at least one functional layer (2,5,11),
   at least one first feature written in the at least one functional layer (2,5,11) which is observable in reflection,
   at least one second feature written in the at least one functional layer (2,5,11) which is observable in transmission, and
   wherein at least the one first feature is individualized and wherein the at least one second feature has a diffractive structure.

2. The storage medium as claimed in claim 1,
   wherein the at least one first feature and the at least one second feature are written as microstructurings in the functional layer (2,5,11).

3. The storage medium as claimed in claim 1,
   wherein the at least one first feature and the at least one second feature are written alongside one another in the functional layer (2,5,11).

4. The storage medium as claimed in claim 1,
   wherein the at least one first feature and the at least one second feature are written in at least partly overlapping fashion in the functional layer (2,5,11).

5. The storage medium as claimed in claim 1, wherein the at least one first feature is embodied as a relief structure in at least one reflective functional layer of the storage medium.

6. The storage medium as claimed in claim 1,
   wherein the at least one first feature which is observable in reflection is embodied as a structure having a different optical density.

7. The storage medium as claimed in claim 1,
   wherein the at least one first feature observable in reflection is a reflectively diffractive structure or a structure observable reflectively by means of brightness modulations.

8. The storage medium as claimed in claim 7,
   wherein the reflectively diffractive structure is observable by means of different brightnesses modulation and/or colors.

9. The storage medium as claimed in claim 7,
   wherein the reflectively diffractive structure is a micro-image, in particular a metallically lustrous micro-image.

10. The storage medium as claimed in claim 1,
    wherein the at least one feature which is observable in reflection is embodied as a reflectively diffractive information content or information content that can be observed reflectively by means of brightness modulations.

11. The storage medium as claimed in claim 10,
    wherein the reflectively diffractive information content is a computer-generated hologram.

12. The storage medium as claimed in claim 10,
    wherein the information content observable reflectively by means of brightness modulations is one of a micro-script, a micro-image or a barcode.

13. The storage medium as claimed in claim 1,
    wherein the at least one feature observable in transmission is embodied as a structure having a different optical density, in particular as an at least partly perforated reflective functional layer.

14. The storage medium as claimed in claim 1,
    wherein the at least one first feature which is observable in transmission is embodied as a transmissively diffractive structure or structure that can be observed transmissively by means of brightness modulators.

15. The storage medium as claimed in claim 14,
    wherein the transmissively diffractive structure is a diffraction pattern.

16. The storage medium as claimed in claim 14,
    wherein the transmissively diffractive structure is observable by means of brightness modulations with a micro-image, in particular a gray-scale image.

17. The storage medium as claimed in claim 1,
    wherein the at least one feature observable in transmission is embodied as a transmissively diffractive information content or information content that can be observed transmissively by means of brightness modulations.

18. The storage medium as claimed in claim 17,
    wherein the transmissively diffractive information content is a computer-generated hologram.

19. The storage medium as claimed in claim 17,
    wherein the information content that can be observed transmissively by means of brightness modulations is a micro-script or a barcode, in particular in the form of a gray-scale image.

20. The storage medium as claimed in claim 1,
    wherein at least one first features is a level-one security feature, and the at least one second feature is a level-two or level-three security feature.

21. A method for producing a storage medium comprising a security feature as claimed in claim 1, comprising the steps of
    providing at least one first feature observable in reflection which is written in at least one functional layer of the storage medium,
    providing at least one second feature observable in transmission which is written in the at least one functional layer of the storage medium,
    wherein at the at least one first feature is individualized, and
    wherein the at least one second feature is written as a diffractive structure.

22. The method as claimed in claim 21, wherein the at least one first feature and the at least one second feature are written as micro-structuring into the functional layer.

23. The method as claimed in claim 21, wherein the at least one first feature and the at least one second feature are written alongside one another in the functional layer.

24. The method as claimed in claim 21, wherein the at least one first feature and the at least one second feature are written in at least partly overlapping fashion in the functional layer.

25. The method as claimed in claim 21, wherein the at least one first feature and the at least one second feature are written into the functional layer by means of a lithographic process.

26. The method as claimed in claim 25, wherein, by altering at least one process parameter pulse duration of the laser pulses, energy of the laser pulses, number of laser pulses per structure to be written and temporal laser pulse separation, differently effective structures (Type1a, Type1b, Type2, Type 3) are written into the at least one functional layer.

27. The storage medium as claimed in claim 6,
    wherein the at least one first feature which is observable in reflection is embodied as an at least partly perforated reflective functional layer.

28. The storage medium as claimed in claim 7,
    wherein the micro-image is a metallically lustrous micro-image.

29. The storage medium as claimed in claim 7,
    wherein the at least one feature observable in transmission is embodied as a structure having a different optical density, in particular as an at least partly perforated reflective functional layer.

30. The storage medium as claimed in claim 16,
    wherein the micro-image is a gray-scale image.

* * * * *